United States Patent [19]

Kuder

[11] Patent Number: 4,937,321

[45] Date of Patent: Jun. 26, 1990

[54] PROCESS FOR PREPARING POLY((BENZO(1,2-D:5,4-D')BISTHIAZOLE-2,6-DIYL)-1,4-PHENYLENE

[75] Inventor: James E. Kuder, Fanwood, N.J.

[73] Assignee: Hoechst Celanese Corp., Somerville, N.J.

[21] Appl. No.: 542,813

[22] Filed: Oct. 17, 1983

[51] Int. Cl.$^5$ .................. C08G 69/00; C08G 75/32
[52] U.S. Cl. ............................. 528/337; 528/341
[58] Field of Search .......................... 528/337, 341

[56] References Cited

U.S. PATENT DOCUMENTS 4,051,108  9/1977  Helminiak et al. ............... 528/337
4,487,735 12/1984  Chenevey et al. ............... 528/337

Primary Examiner—Harold D. Anderson
Attorney, Agent, or Firm—Burns Doane Sweckert & Mathis

[57] ABSTRACT

A process for preparing poly{[benzo (1,2-d:5,4-d')bisthiazole-2,6-diyl]-1,4-phenylene} or one of the reactants used in the preparation of such polymer by the use of an electrolytic cell. In the process, thiocyanate ions are oxidized to thiocyanogen in the anode chamber of the cell. In a preferred embodiment, the cathode chamber of the same electrolytic cell is used to reduce 4,6-dithiocyanobenzene-1,3-diamine to form the dithio radical of 4,6-diaminobenzene-1,3-dithiol. Upon hydrogenation, the dithiol or its acid salt may be used to react with terephthalic acid to form the polymer.

13 Claims, 1 Drawing Sheet

PROCESS FOR PREPARING POLY((BENZO(1,2-D:5,4-D')BISTHIAZOLE-2,6-DIYL)-1,4-PHENYLENE

BACKGROUND OF THE INVENTION

1. Field of the Invention

This invention relates to a process for preparing poly{[benzo(1,2-d:5,4-d')bisthiazole-2,6-diyl]-1,4-phenylene}. In a further aspect, this invention relates to a process for preparing 4,6-diaminobenzene-1,3-dithiol.

2. Description of the Prior Art

Various procedures are known in the art for preparing poly {[benzo(1,2-d:4,5-d')bisthiazole-2,6-diyl]-1,4-phenylene} and its cis isomer in order to form shaped articles. For example, in U.S. Pat. No. 4,225,700, the trans isomer is prepared by reacting 2,5-diamino-1,4-benzenedithiol dihydrochloride with terephthalic acid in polyphosphoric acid. The polymerization mixture is precipitated into water and successively washed with water, dilute ammonium hydroxide and then water. Alternatively, the mixture is combined with methanesulfonic acid, precipitated into methanol and successively washed with water, aqueous ammonium hydroxide and methanol and then freeze dried from benzene.

In U.S. Pat. No. 4,051,108, the cis isomer as well as other para ordered aromatic heterocyclic polymers are formed into films and coatings from a dispersion of particles of the polymer. The patent, however, does not set forth a process for preparing the cis isomer. A similar technique is described in U.S. Pat. No. 3,987,015.

In U.S. Pat. No. 3,681,297, related but distinct polybenzothiazoles are prepared by reacting a selected dialdehyde with a defined aromatic bismercaptoamine to obtain a polybenzothiazoline. This material is then subjected to oxidation to obtain the related polybenzothiazole. In the event that unconverted reactants remain, the patent discloses that the polymer may be heated in excess of 175° C., preferably in the range of 250–400° C. in nitrogen or 250°–350° C. in air to cause chain extending polymerization.

Imai et al, "Polybenzazoles," Makromolekulare chimi, Vol. 83, July, 1964, pages 179–187, discloses the self condensation of amino-benzoic acid compounds to form high molecular weight polybenzazoles. In the introduction of the art, reactions of di-substituted benzidines with dicarboxylic acids are described.

In Likhosherstov et al, J. Gen Chem. U.S.S.R., 3, 183 (1933) described in Chem. Abst. 28: 1677 (1934), refers to the use of the reaction product of dichlorourea and ammonium cyanate with m-phenylenediamine to afford the dithiocyano compound.

In Grandolini et al, Gazz. Chim. Ital., 89, 2543 (1959), dithiocyanates can be made to cyclyze on treatment with acid.

In the publication to V. K. Schwabe and J. Voight entitled "Zur Reduktion organischer Rhodenverbindungen an Quecksilberkathoden in Z. Elektrochem., 56, 44 (1952), aromatic thiocyanates are electrochemically reduced to the corresponding thiol.

In application Ser. No. 483,799 filed on Apr. 11, 1983 in the name of Edward C. Chenevey, entitled "Process for Heat Treating Shaped Articles of Poly{[benzo[1,2-d:4,5-d') bisthiazole-2,6-diyl]-1,4-phenylene}, Its Cis Isomer or Mixtures Thereof and the Articles Formed Thereby" and assigned to the assignee of the present application, there is described a process for simultaneously heating and stretching shaped articles of the defined polymer.

In application Ser. No. 483,797 filed on Apr. 11, 1983, now U.S. Pat. No. 4,487,735, in the names of Edward C. Chenevey and Ronald Kafchinski, entitled "Process for Preparing Film of Poly{[benzo(1,2-d:4,5-d') bisthiazole-2,6-diyl]-1,4-phenylene}, Its Cis Isomer or Mixtures Thereof", assigned to the assignee of the present application now U.S. Pat. No. 4,487,735, there is described a process for preparing film of the polymer by extruding it on a casting roll, subjecting it to elevated temperatures and, preferably, heat treating it under tension.

In application Ser. No. 483,798 filed on Apr. 11, 1983, in the names of Edward C. Chenevey and Thaddeus E. Helminiak, entitled "Process for Preparing Shaped Articles of Rigid Rod Heterocyclic Liquid Crystalline Polymers" and assigned to the assignee of the present application, there is described a process for preparing shaped articles of polymers such as poly{[benzo(1,2-d:4,5-d')bisthiazole-2,6-diyl]-1,4-phenylene} by polymerizing the reactants in a reaction medium and directly forming the shaped articles therefrom.

In application Ser. No. 542,831 filed in the name of Edward C. Chenevey, entitled "Process for Preparing Shaped Articles of Poly{[benzo(1,2-d:4,5-d')bisthiazole-2,6-diyl]-1,4-phenylene}, Its Cis Isomer or Mixtures Thereof from a Dope Containing Concentrated Sulfuric Acid" and assigned to the assignee of the present application, the cis isomer and/or the trans isomer is dissolved into concentrated sulfuric acid and the resulting dope is used to form shaped articles.

OBJECTS AND SUMMARY OF THE INVENTION

It is a general object of this invention to provide a process for producing a polymer which is useful in the production of high modulus, high strength materials having excellent thermal stability.

It is a more specific object of this invention to provide a process for preparing poly{[benzo(1,2-d:5,4-d') bisthiazole-2,6-diyl]-1,4-phenylene} economically and efficiently.

It is a further object of this invention to provide an efficient process for preparing 4,6-diaminobenzene-1,3-dithiol.

In one aspect, the present invention provides a process for preparing poly{[benzo(1,2-d:5,4-d')bisthiazole-2,6-diyl]-1,4-phenylene}. The process comprises:

(a) electrochemically oxidizing thiocyanate ions to form thiocyanogen;

(b) reacting the thiocyanogen with m-phenylenediamine to form 4,6-dithiocyanobenzene-1,3-diamine;

(c) reducing the 4,6-dithiocyanobenzene-1,3-diamine to form the dithio radical of 4,6-diaminobenzene-1,3-dithiol;

(d) acidifying the dithio radical; and (e) reacting the formed 4,6-diaminobenzene-1,3-dithiol or its acid salt with terephthalic acid to form the polymer.

In another aspect, the present invention provides a process for preparing 4,6-diaminobenzene-1,3-dithiol. The process comprises:

(a) electrochemically oxidizing thiocyanate ions to form thiocyanogen;

(b) reacting the thiocyanogen with m-phenylenediamine to form 4,6-dithiocyanobenzene-1,3-diamine;

(c) reducing the 4,6-dithiocyanobenzene-1,3-diamine to form the dithio radical of 4,6-diaminobenzene-1,3-dithiol; and (d) acidifying the dithio radical to form 4,6-diaminobenzene-1,3-dithiol or its acid salt.

DESCRIPTION OF THE PREFERRED EMBODIMENTS

Figure 1:
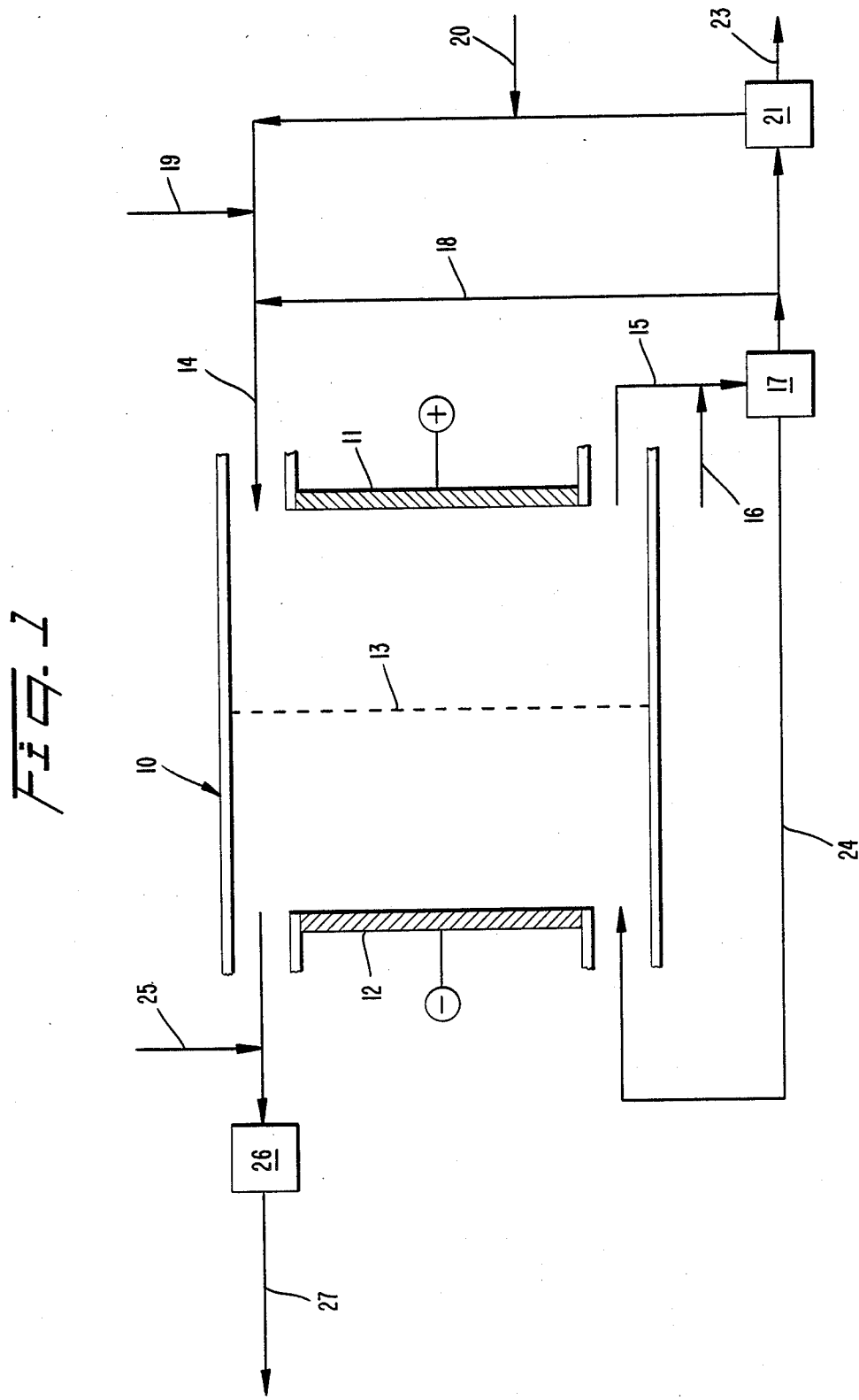
FIG. 1 is a flow diagram illustrating one aspect of the present invention.

As stated above, one aspect of the present invention relates to a process for preparing poly{[benzo(1,2-d:5,4-d') bisthiazole-2,6-diyl]-1,4-phenylene} having the following recurring unit:

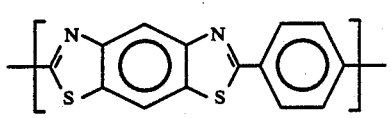

The polymer may be characterized as a rigid rod polymer (due to the configuration of the polymer chain) which exhibits liquid crystalline (i.e., anisotropic) properties when in solution. The polymer possesses high thermo-oxidative resistance, high tensile strength and modulus and may be employed as a substitute for fiber reinforced composite in aerospace vehicles.

To prepare poly{[benzo(1,2-d:5,4-d')bisthiazole-2,6diyl]-1,4-phenylene} in accordance with the present invention, thiocyanate ions are first electrochemically oxidized to form thiocyanogen. This reaction is illustrated by the equation:

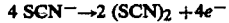

While this reaction may be achieved chemically by the use of an oxidizing agent, exemplified by bromine, such a chemical oxidizing agent is itself typically prepared electrochemically. Hence, the present invention advantageously avoids the need of an additional step of preparing an oxidizing agent to prepare the thiocyanogen.

According to the invention, a compound which will form thiocyanate ions is introduced into the anode compartment of an electrolytic cell. The compound may be represented by the general formula: MSCN wherein M is hydrogen, a Group Ia or IIa metal or ammonium. Preferably, M is sodium, potassium or ammonium. Typically, the compound is introduced into the anode compartment in the form of an aqueous solution or mixed aqueous-organic solution having a pH in the range of from about 0 to about 6. Where organic solvents are present, they are generally completely miscible with water and may be acetic acid, acetonitrile and preferably ethanol in volume ratios of solvent to water ranging from about 10:1 to about 1:10, preferably from about 5:1 to about 1:5.

The electrolytic cells which may be employed to practice the process of the invention are well known to those skilled in the art. Exemplary electrolytic cells are disclosed in the publication to D. T. Chin and C. Y. Cheng, entitled "Electrochemical Engineering Principles," Chap. 1 in N. L. Weinburg and B. V. Tilak, eds. "Technique of Electroorganic Synthesis." Part III, Wiley-Interscience (1982), the contents of which are incorporated by reference. One simple electrolytic cell is a tank which is separated into an anode chamber and a cathode chamber separated by a selectively permeable membrane. Likewise, a series of anode and cathode chambers separated by membranes may be used. Although the process may be operated on a batch basis, it is preferable to operate the cell on a continuous basis. In this instance, an inlet for the aqueous solution of the thiocyanate ions is arranged such that the solution fully contacts the anode which may be constructed from materials such as platinum, carbon, lead oxide, or a dimensionally stable anode (DSA ®) such as ruthenium oxide on titanium. Contact with the anode may be improved by employing stirring means in the anode chamber.

The solution typically contains the thiocyanate ions in a concentration ranging from about 0.1 to about 5 moles per liter, preferably from about 1 to about 3 moles per liter. At a distance from the inlet, an outlet removes an aqueous mixture of thiocyanogen and unconverted thiocyanate ions.

In the cathode chamber, any compatible reaction may be undertaken to balance the oxidation of the thiocyanate ion in the anode chamber and the cell temperature, concentration, voltage and current will vary depending on the reaction selected. As mentioned previously and as discussed in greater detail below, in one preferred aspect of the present invention, 4,6-dithiocyanobenzene-1,3-diamine resulting from the reaction of m-phenylenediamine and thiocyanogen is reduced in the cathode chamber to form the dithio radical of 4,6-diaminobenzene-1,3dithiol.

Other reactions which can be carried out in the cathode chamber are exemplified by the reduction of elemental oxygen in an aqueous environment to hydroxyl groups or to water depending on whether the pH of the cathode chamber is basic or acidic, respectively. In using alternate reactions in the cathode chamber, it is preferable to maintain the internal resistance of the cell relatively low and to keep the voltage potential difference between the anode reaction and the cathode reaction low so as to carry out the process efficiently. In this regard, the potential for the reaction:

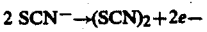

is +0.77 volts when a normal hydrogen electrode is used or +0.53 volts when a saturated calomel electrode is used as the reference electrode.

After the electrochemically produced thiocyanogen is removed from the anode chamber, it is generally directly reacted with the m-phenylenediamine. One reason for using the thiocyanogen promptly is that the compound is unstable and tends to polymerize or, if in an acidic environment, tends to hydrolyze. A further reason is that the unconverted thiocyanate ions in the aqueous mixture do not substantially adversely affect the reaction so that the untreated reaction product may be employed.

Reaction of the thiocyanogen with the m-phenylenediamine can be facilitated by actually introducing the m-phenylenediamine with the source of the thiocyanogen (i.e., the thiocyanate ion) into the anode chamber. This is possible because the thiocyanate is oxidized in preference to the m-phenylenediamine as long as the thiocyanate is in excess.

The reaction is as follows:

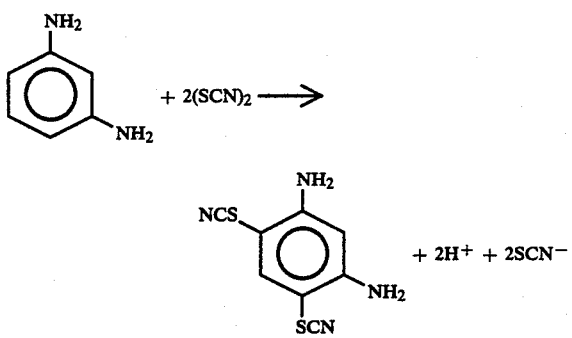

In the reaction, two thiocyanogen molecules are reacted with each m-phenylenediamine molecule. This is believed to be due to the characteristic of the thiocyanogen as a "pseudo halogen". That is, in reacting with the hydrogen atoms on the aromatic ring, one SCN group attaches to the aromatic ring while the other reacts with the removed hydrogen atom to form HSCN. Thus, two $(SCN)_2$ groups are believed used to form each molecule of 4,6-dithiocyanobenzene-1,3-diamine.

In practice, it is preferable to employ a molar excess of thiocyanogen to ensure a high level of conversion of the m-phenylenediamine and, as mentioned earlier, to prevent any inadvertent oxidation of any m-phenylenediamine which may be present.

Reaction of the thiocyanogen with the m-phenylenediamine is typically achieved in a reaction vessel composed of materials, such as polypropylene, polyethylene, etc., which will not be affected by the reaction which is typically conducted at a temperature of from about $-10°$ to about $+30°$ C. While not essential, it is preferred to conduct the reaction in the absence of oxygen such as under a nitrogen atmosphere. Additionally, while the reaction can be conducted on a batch basis, it is preferably conducted continuously in a flow-through reactor.

Upon completion of the reaction, the formed 4,6-dithiocyanobenzene-1,3-diamine may be separated from the reaction mixture by any known technique. One preferred manner of achieving separation is cooling the mixture to from about $-10°$ C. to about $+10°$ C. whereby the diamine solidifies and can be readily separated by filtration, decantation, centrifugation or other liquid-solid separation techniques. When a mixed aqueous-organic solution is employed, precipitation of the diamine can be achieved by diluting the reaction mixture with water due to the insolubility of the diamine in water. Cooling the mixture to the aforementioned range will facilitate precipitation and will reduce the incidence of the formation of the by-product polythiocyanogen. The formation of this by-product can also be maintained at low levels by efficient stirring and by conducting the electrolysis at relatively low current densities (e.g., less than about 200 mA/cm$^2$).

The remaining liquid may be directly recycled back to the anode chamber such that the HSCN can be again made available for conversion to thiocyanogen. Alternatively, the recycle liquid may be first mixed with an aqueous basic solution, such as NaOH, so that the thiocyanate ions are recycled in neutral salt form rather than as an acid. With the use of a recycle stream, the consumption of thiocyanate ions may be reduced by about 50% relative to a process wherein no recycle is employed.

The formed 4,6-dithiocyanobenzene-1,3-diamine is thereafter converted to 4,6-diaminobenzene-1,3-dithiol or its diacid salt. This conversion may be achieved by chemical or electrochemical techniques. In the former technique, the diamine is mixed with an acid such as hydrochloric or sulfuric acid, to obtain a pH in the range of from about 0 to about 3. Acidification is preferably achieved under reflux conditions for from about 10 to about 60 minutes. Acidification causes cyclization and formation of 2,6-diaminobenzo-[1,2-d:5,4-d'] bisthiazole having the following formula:

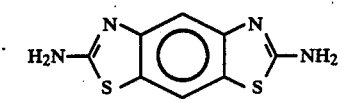

After reducing the temperature to about ambient temperature, the bisthiazole can be isolated by mixing the acidified solution with a weak basic reagent, such as ammonium hydroxide, in an amount sufficient to cause precipitation of the bisthiazole (e.g., to a pH of about 10). After separating the bisthiazole from the soluble impurities (e.g., by filtration), it is subjected to base catalyzed ring opening by mixing it with a conventional strong basic agent, such as an aqueous solution of potassium hydroxide or sodium hydroxide, in amounts sufficient to obtain a pH in the range of from about 10 to about 14. This results in the formation of a dithio radical of 4,6-diaminobenzene-1,3-dithiol in accordance with the following reaction:

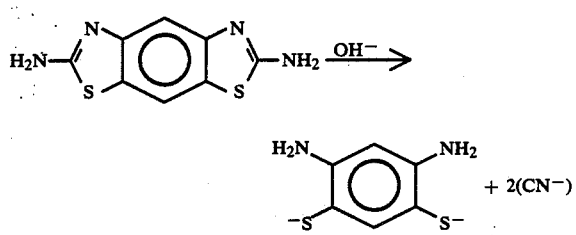

The reaction product is neutralized with acids, such as hydrochloric, sulfuric or acetic acid, which causes the resulting 4,6-diaminobenzene-1,3-dithiol salt (e.g., the dihydrochloride salt) to precipitate. While the dithiol form can be obtained by reducing the amount of acid, the salt form is preferred since it is less susceptible to oxidation. Separation may be facilitated by cooling the mixture to a temperature in the range of from about 0° to about 10° C. The dithiol salt may thereafter be readily separated by known suitable liquid-solid separation techniques.

In a more preferred aspect of the present invention, the 4,6-dithiocyanobenzene-1,3-diamine is converted to the dithio radical of 4,6-diaminobenzene-1,3-dithiol electrochemically. This involves the introduction of the diamine in a wholly aqueous solution or a mixture of water and a water miscible organic solvent, such as ethanol, acetic acid or acetonitrile, into the cathode chamber of the same electrolytic cell used to oxidize the thiocyanate ions. The cathode is preferably constructed of a high hydrogen overvoltage metal, such as lead, tin, cadmium or mercury to inhibit the evolution of hydrogen.

The mixture containing the diamine has pH in the range of from about 0 to about 4 and should be directed to flow over the cathode to obtain a high level of conversion of the diamine. In those instances wherein a flow-through electrolytic cell is operated on a continuous basis, the diamine is introduced at a concentration in the range of from about 0.05 to about 5 moles per liter, preferably from about 0.1 to about 0.5 moles per liter. The cell is operated at a temperature in the range of from about −10° to about 30° C. and a direct current density of from about 5 to about 200 mA/cm$^2$, preferably from about 10 to about 100 mA/cm$^2$. At the cathode, the following reduction reaction occurs:

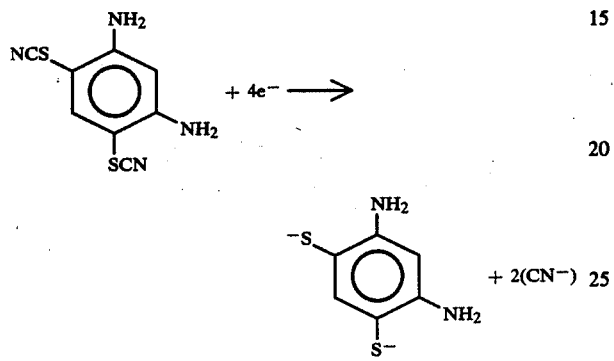

The reaction mixture can then be combined with an acid (e.g., hydrochloric acid, sulfuric acid, acetic acid, etc.) in gaseous or liquid form in an amount sufficient to yield a pH from about 0 to about 2 to obtain the acid salt. By this preferred technique, the 4,6-diaminobenzene-1,3-dithiol or preferably its acid salt may be efficiently prepared without the need for oxidizing agents in order to prepare the thiocyanogen which reacts with the m-phenylenediamine and without the need for consecutive acid and base treatment steps to prepare the dithio radical. The elimination of these chemical processing agents by the use of an electrolytic cell marks a significant advance in the art. The resulting product may then be separated from the cyanide ions in the manner previously described above.

After the 4,6-diaminobenzene-1,3-dithiol or its acid salt is recovered, it is reacted with terephthalic acid to form poly [benzo(1,2-d:5,4-d')bisthiazole-2,6-diyl]-1,4-phenylene. This is typically achieved by dissolving the dithiol or its acid salt in an appropriate solvent, preferably polyphosphoric acid, to obtain a mixture containing from about 1 to about 10% by weight of the dithiol. Such solvents are commercially available, but they may also be synthesized. For example, polyphosphoric acid may be prepared by mixing cold phosphoric acid and phosphorus pentoxide and then heating the mixture as described in U.S. Pat. No. 4,225,700, the contents of which are incorporated by reference.

In the event that the acid salt of the dithiol (e.g., the dihydrochloride salt) is used, the mixture is generally first heated to about 70°-90° C. for about 24 hours to desalt the compound (e.g., by evolution of HCl). Thereafter, powdered therephthalic acid is added to the mixture in an approximately equimolar amount optionally along with additional polyphosphoric acid to ensure that the reactants are in solution. The mixture is slowly heated with stirring to from about 150° to about 180° C. for from about 18 to 48 hours.

The formed polymer may then be recovered in accordance with the techniques described in aforementioned U.S. Pat. No. 4,225,700 and the recovered polymer may be dissolved in a suitable solvent such as methanesulfonic acid, chlorosulfonic acid, sulfuric acid or polyphosphoric acid to form shaped articles such as fibers, filaments, yarns and films. Alternatively, if the polymer is prepared in polyphosphoric acid, shaped articles may be prepared directly from the reaction mixture in accordance with aforementioned commonly assigned U.S. patent application Ser. No. 483,798 filed on Apr. 11, 1983 and entitled "Process for Preparing Shaped Articles of Rigid Rod Heterocyclic Liquid Crystalline Polymers" by Edward C. Chenevey and Thaddeus E. Helminiak, the contents of which are incorporated by reference.

To obtain a more complete understanding of the present invention, the following examples are set forth. It should be understood, however, that the invention is not limited to the specific details set forth therein.

Preparation of 4,6-dithiocyanobenzene-1,3-diamine

EXAMPLE 1

In each compartment of a two-compartment glass electrolysis cell is placed 75 ml of ethanol-water (2:1 by volume) which is 0.3 molar in HCl, and the cell is cooled to 0° C. Carbon rods serve as both anode and cathode, and the anode compartment is equipped with a magnetic stirrer. To the anode compartment is added m-phenylenediamine (3.24 g, 0.03 mole) and NH$_4$SCN (11.4 g, 0.15 mole). When the solution is complete, the electrolysis is run at a controlled anodic potential of 1.2 V against a saturated calomel electrode (initial current density 15 mA/cm$^2$) until 125% of the theoretically required amount of electricity has passed. The anolyte is removed from the cell, filtered to remove traces of polythiocyanogen, and diluted with an equal volume of water, whereupon the desired product precipitates in 80–90% yield. Further dilution results in the precipitation of small amounts of the monothiocyano product.

EXAMPLE 2

The process of Example 1 is repeated except that the electrolytic thiocyanation is carried out using acetic acid-water (4:1 by volume) as the solvent-electrolyte in place of the acidic ethanol-water medium. Substantially the same results are obtained.

Preparation of 4,6diaminobenzene-1,3-dithiol via diaminobenzobisthiazole

EXAMPLE 3

4,6-dithiocyanobenzene-1,3-diamine (2.22 g, 0.01 mole) is refluxed for 30 minutes in 50 ml of 20% HCl. After cooling to room temperature, the solution is diluted with 50 ml of water and made basic (pH 10) with NH$_4$OH. The desired product, 2,6-diaminobenzobisthiazole, is obtained as a solid from the above treatment, and is collected by filtration in essentially quantitative yield.

The product so obtained is converted to the potassium salt of 4,6-diaminobenzene-1,3-dithiol by heating to reflux for 5 hours in 21 N potassium hydroxide. On cooling and standing, the desired potassium salt precipitates and is collected by filtration under nitrogen. The potassium salt is converted to the dihydrochloride salt by dissolving it in a small quantity of deaerated water and pouring the solution into 3 N HCl containing 5% stannous chloride (to prevent air oxidation of the thiol products). The dihydrochloride salt forms as a finely divided solid, and is obtained in crystalline form after heating to 70° C. and adding an equal volume of 12 N HCl. The crystalline product is collected by filtration and washed with diethyl ether.

Preparation of 4,6-diaminobenzene-1,3-dithiol via cathodic reduction

EXAMPLE 4

In each compartment of a two-compartment glass electrolysis cell is placed 75 ml of ethanol-water (2:1 by volume) which is 0.3 M in KCl. A lead foil serves as the cathode, a carbon rod as anode, and provision is made for stirring the catholyte. To the cathode compartment is added 4,6-dithiocyanobenzene-1,3-diamine (2.22 g, 0.01 mole) and, after the solution is complete, the electrolysis is run under nitrogen at a controlled cathodic potential of −1.8 V against a saturated calomel electrode (initial current density 20 mA/cm$^2$) until 100% of the theoretically required amount of electricity is passed. The product is obtained as the dihydrochloride salt by passing the catholyte into an equal volume of 12 N HCl, taking care to exclude air as much as possible.

EXAMPLE 5

The process of Example 4 is repeated except that the cathodic reduction is carried out using acetic acid-water (4:1 by volume) as the solvent-electrolyte in place of the ethanol-water medium. Substantially the same results are obtained.

EXAMPLE 6

After electrolytic thiocyanation as described in Example 1, the anolyte is not removed from the cell nor the intermediate 4,6-dithiocyanobenzene-1,3-diamine isolated. The carbon electrode is replaced by a lead electrode, and the cathodic reduction is carried out at a controlled potential of −1.8 V against a saturated calomel electrode. 4,6-diaminobenzene-1,3-dithiol is isolated as the dihydrochloride salt, as described in Example 4.

EXAMPLE 7

The process of Example 6 is repeated except that acetic acid-water (4:1 by volume) is used in place of acidified ethanol-water. Substantially the same results are obtained.

Synthesis using matched anodic and cathodic processes

EXAMPLE 8

After carrying out the anodic thiocyanation as described in Example 1, the anolyte is transferred to the cathode chamber, and a fresh solution of m-phenylenediamine plus NH$_4$SCN in acidified ethanol-water is placed in the cathode chamber. The electrolysis is now carried out with an applied anodic potential of 1.2 V against a saturated calomel electrode. The product is isolated from the cathode chamber in the manner described in Example 4, and the thiocyanation product is isolated from the anode chamber in the manner described in in Example 1.

Continuous flow synthesis using matched anodic and cathodic reactions

EXAMPLE 9

With reference to FIG. 1, a continuous flow module 10 (one cell of which is illustrated) is equipped with carbon anodes 11 lead cathodes 12 (electrode gap 0.5 cm) and perfluorosulfonic acid membranes 13 available from Du Pont under the name Nafion®. The total anode area is 1.04 m$^2$, as is the total cathode area. Into the anode inlet is fed a solution through line 14, at 10° C., of m-phenylenediame (0.26 mole/l) and NH$_4$SCN (2.0 mole/l) in ethanol-water (2:1 by volume) which is 0.3 N in HCl. The outlet from the anode compartment is passed through line 15 and is combined with an equal volume of water introduced through line 16 and is led to a filtration unit 17, which separates the solid thiocyanation product.

A portion of the filtrate is recycled through line 18 whereupon it is mixed with an equal volume of ethanol which contains m-phenylenediamine introduced through line 19 and (0.52 mole/l) NH$_4$SCN (0.37 mole/l) and HCl (0.45 mole/l) introduced through line 20. The portion of the filtrate which is not immediately recycled is distilled in unit 21 to recover the ethanol portion which is recycled through line 22. The aqueous remainder from the distillation is removed via line 23 and is concentrated to recover NH$_4$SCN.

The cell is operated at a current density of 20 mA/cm$^2$ and a liquid flow rate of 0.15 l/min.

The thiocyanation product obtained from the anode reaction is used to prepare a solution containing dithiocyanobenzenediamine (0.26 mole/l) and KCl (0.3 mole/l) in ethanol-water (2:1 by volume). This solution is fed into the inlet of the cathode chamber through line 24 where reduction to the dithiol product occurs. The outlet stream from the cathode chamber is treated with HCl gas introduced through line 25 until the solution is 12 N in HCl, whereupon the desired product precipitates from solution as the dihydrochloride salt, which is collected via filtration unit 26 and recovered in line 27.

EXAMPLE 10

The continuous reactor is operated as in Example 9, except that the intermediate dithiocyano compound is not isolated. Instead, the outlet stream from the anode chamber is neutralized with 10% KOH (pH 6–8) and passed into the inlet of the cathode chamber. Substantially the same results are obtained.

Preparation of poly [benzo(1,2-d:5,4-d')bisthiazole-2,6-diyl]- 1,4-phenylene

EXAMPLE 11

Using the 4,6-diaminobenzene-1,3-dithiol dihydrohloride of Examples 9 or 10, the polymer is formed by dissolving the acid salt in polyphosphoric acid, heating the mixture to effect dehydrochlorination and reacting it with terephthalic acid in accordance with the procedures set forth in aforementioned U.S. Pat. No. 4,225,700.

Although the invention has been described with preferred embodiments, it is to be understood that variations and modifications may be resorted to as will be apparent to those skilled in the art. Such variations and modifications are to be considered within the scope of the following claims.

I claim:
1. A process for preparing poly{[benzo(1,2-d:5,4-d') bisthiazole-2,6-diyl]-1,4-phenylene} comprising:
   (a) electrochemically oxidizing thiocyanate ions to form thiocyanogen;
   (b) reacting the thiocyanogen with m-phenylenediamine to form 4,6-dithiocyanobenzene-1,3-diamine;
   (c) reducing the 4,6-dithiocyanobenzene-1,3-diamine to form the dithio radical of 4,6-diaminobenzene-1,3-dithiol;
   (d) acidifying the dithio radical; and

(e) reacting the formed 4,6-diaminobenzene-1,3-dithiol or its acid salt with terephthalic acid to form the polymer.

2. The process of claim 1 wherein the thiocyanate ions are present in an aqueous or aqueous organic solution of the compound MSCN wherein M is hydrogen, a Group Ia metal, a Group IIa metal or ammonium.

3. The process of claim 2 wherein M is sodium, potassium or ammonium.

4. The process of claim 2 wherein the pH of the aqueous solution is in the range of from about 0 to about 6.

5. The process of claim 1 wherein the electrochemically prepared thiocyanogen is directly reacted with the m-phenylenediamine.

6. The process of claim 5 wherein thiocyanate ions remaining from step (b) are recycled to step (a).

7. The process of claim 1 wherein the 4,6-dithiocyanobenzene-1,3-diamine is acidified to cause formation of 2,6-diaminobenzo(1,2-d:5,4-d') bisthiazole which is then subjected base catalyzed ring opening to form the dithio radical.

8. The process of claim 1 wherein the 4,6-dithiocyanobenzene-1,3-diamine is electrochemically reduced in an electroconductive mixture in the cathode chamber of an electrolytic cell.

9. The process of claim 8 wherein the anode chamber of the electrolytic cell is used to electrochemically oxidize the thiocyanate ions to thiocyanogen.

10. The process of claim 9 wherein the concentration of the 4,6-dithiocyanobenzene-1,3-diamine is in the range of from about 0.05 to about 5 moles per liter.

11. The process of claim 9 wherein the cell is operated at a current density of about 10 to about 100 mA/cm$^2$.

12. The process of claim 1 wherein the 4,6-diaminobenzene-1,3-dithiol is recovered as the acid salt by adjusting the pH from about 0 to about 2.

13. The process of claim 1 wherein the reaction of 4,6-diaminobenzene-1,3-dithiol or its acid salt with terephthalic acid is conducted in polyphosphoric acid.

* * * * *